Jan. 9, 1951     V. H. SEELY     2,537,554

AUTOMOBILE JACK

Filed Oct. 7, 1946

INVENTOR
Vane H. Seely
BY E. B. Richenbach
ATTORNEY

Patented Jan. 9, 1951

2,537,554

UNITED STATES PATENT OFFICE 2,537,554

AUTOMOBILE JACK

Vane H. Seely, Portland, Oreg.

Application October 7, 1946, Serial No. 701,715

1 Claim. (Cl. 254—1)

This invention relates generally to automobiles, and particularly to an automobile jack.

The main object of this invention is to provide an exceedingly simple and efficient form of jack, which can be easily moved along the ground when unloaded, but which will have ample bearing service when loaded.

The second object is to produce a jack of the class described, which can be moved into position without special effort on the part of the operator.

I accomplish these and other objects in the manner set forth in the following specification as illustrated in the accompanying drawings, in which.

Figure 1:
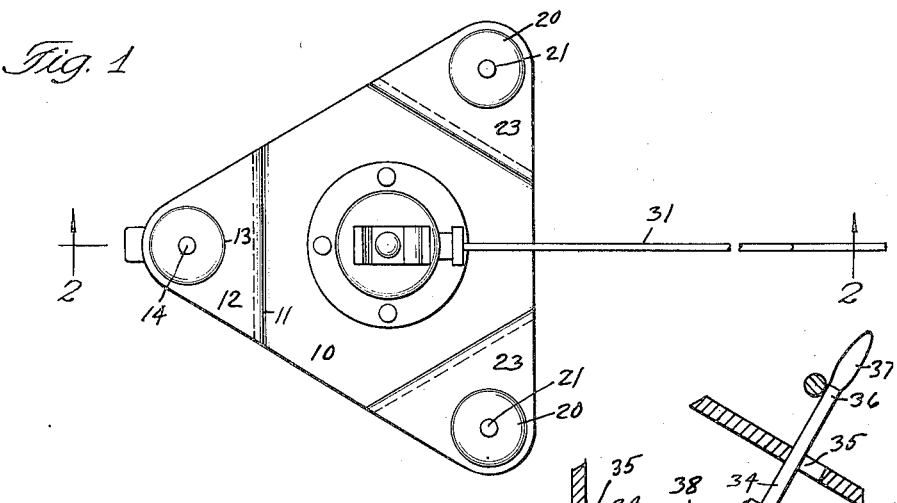
Fig. 1 is a plan of the back.
Figure 3:
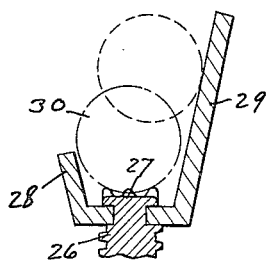
Fig. 3 is a fragmentary section through the axle engaging portion of the jack.
Figure 4:
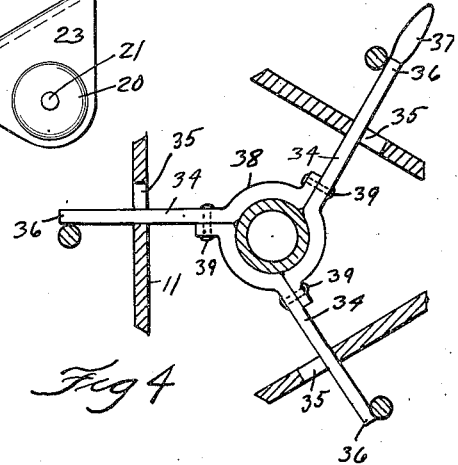
Fig. 4 is a horizontal section taken above the operating lever.
Figure 2:
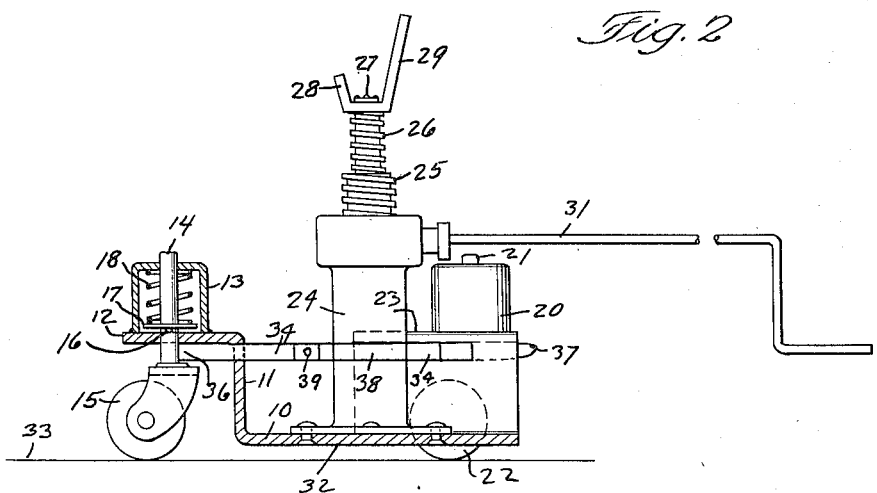
Fig. 2 is a vertical section through the jack taken along the line 2—2 in Fig. 1.

Referring in detail to the drawing, there is shown a base 10, whose forward edge 11 is upturned, and its upper end 12 is turned horizontally and has mounted thereon a housing 13 in which journals the spindle 14 of the caster wheel 15. The spindle 14 is provide with a cotter pin 16 above which is placed a washer 17 between which and the underside of the housing 13 is compressed a spring 18.

The base 10 is somewhat triangular shaped, and has corresponding housing 20 formed thereon, within which are the spindles 21 of the rear wheels 22. The housings 20 are placed upon the flat top portions 23, which are similar to the portion 12.

Supported on the base 10, is a jack 24, which may be of the screw type as shown or of any other desired type, which is hydraulic or pneumatic. If the screw type is employed, it is desirable to have the compound screws 25 and 26 on the latter of which is mounted a head 27 having a low upper extending forward lip 28 and a higher upperly extending backward lip 29, the purpose of which is to use the lip 29 as a stop against the axle 30 when placing the jack in position.

If the screw type jack is employed, the operating wrench handle 31 can be used to maneuver the jack on its wheels 15 and 22. It must be understood that the springs 18 are of sufficient strength to support the jack without a load, but when loaded, will permit the under side 32 to rest upon the surface of the ground 33.

It can be seen that by this construction it is possible to properly place a jack underneath the axle of an automobile without danger of collapse or without resting the car higher than necessary as is the case when the bumper jack is employed.

In order to make it possible to use the jack as a portable jack, I have provided the three arms 34 which extend through slots 35 in the members 11 while the tips 36 can serve as spacers between the tips of the wheel frames of the caster wheels 15 and 22 and the under side of the member 12.

One arm 34 is provided with a handle 37 by means of which all of the arms 34 may be rotated.

The inner ends of the arms 34 are provided with a curved portion 38 all of which are free to rock on the circular portion of the body of the jack 24. The parts 34 are joined by means of the bolts 39.

It can be seen from the foregoing that by turning the handle 37 in one direction, the jack has a spring suspension; while by turning the handle in the opposite direction the springs are rendered inoperative.

I am aware that numerous forms of automobile jacks have been constructed in the past. I, therefore, do not claim such a device broadly, but I do intend to cover all such forms and modifications thereof, as fall fairly within the appended claim.

I claim:

A portable automobile jack having a three wheeled base, said wheels having spring mountings adapted to permit said base to rest upon the ground when a load is imposed thereon, one of said wheels having a caster mounting, a lifting jack mounted on said base and means for rendering said springs inoperative so as to maintain said base above the ground when the jack is loaded whereby the jack may be moved from place to place while loaded.

VANE H. SEELY.

REFERENCES CITED

The following references are of record in the file of this patent:

UNITED STATES PATENTS

| Number | Name | Date |
|---|---|---|
| 1,415,857 | Avery | May 16, 1922 |
| 1,477,790 | Townsend | Dec. 18, 1923 |
| 2,000,503 | White | May 7, 1935 |

FOREIGN PATENTS

| Number | Country | Date |
|---|---|---|
| 732,000 | France | June 6, 1932 |